United States Patent [19]

Sands

[11] Patent Number: 4,774,804
[45] Date of Patent: Oct. 4, 1988

[54] SAND TRAP RAKE AND GOLF BALL RETRIEVER AND METHOD

[76] Inventor: William M. Sands, 3151 Baylor Dr., Lake Havasu City, Ariz. 86403

[21] Appl. No.: 104,245

[22] Filed: Oct. 5, 1987

[51] Int. Cl.⁴ .......................... A01D 7/10; A63D 53/00
[52] U.S. Cl. ........................................ 56/400.04; 56/8; 273/162 F
[58] Field of Search ................... 56/400.01, 400.04, 8, 56/400.06; 172/380, 378; 273/32 B, 32 F, 32 G, 162 R, 162 E, 162 F

[56] References Cited

U.S. PATENT DOCUMENTS

| D. 190,822 | 7/1961 | Morreale | 56/8 |
|---|---|---|---|
| 1,703,402 | 2/1929 | Matsuoka | 56/8 |
| 2,721,755 | 10/1955 | Walner | 273/32 F |
| 3,870,300 | 3/1975 | Amendola | 56/400.04 |
| 4,174,003 | 7/1979 | Zepeda | 56/400.06 |
| 4,216,831 | 8/1980 | Ritchie | 56/400.04 |
| 4,644,740 | 2/1987 | Lee | 56/400.06 |

OTHER PUBLICATIONS

"Handy Sandy", Golf Digest, Jan. 1972, p. 91.

*Primary Examiner*—John Weiss
*Attorney, Agent, or Firm*—Harry M. Weiss & Associates

[57] ABSTRACT

Disclosed is an improved sand trap rake and golf ball retriever which attaches to a golf club bag and which generally consists of a plate member having teeth and a cord-like system. When used as a sand trap rake, the disclosed device is coupled to a golf club which acts as the rake handle; and when used as a ball retriever, the plate member is thrown past the golf ball and drawn back toward the golfer with the cord-like system.

4 Claims, 1 Drawing Sheet

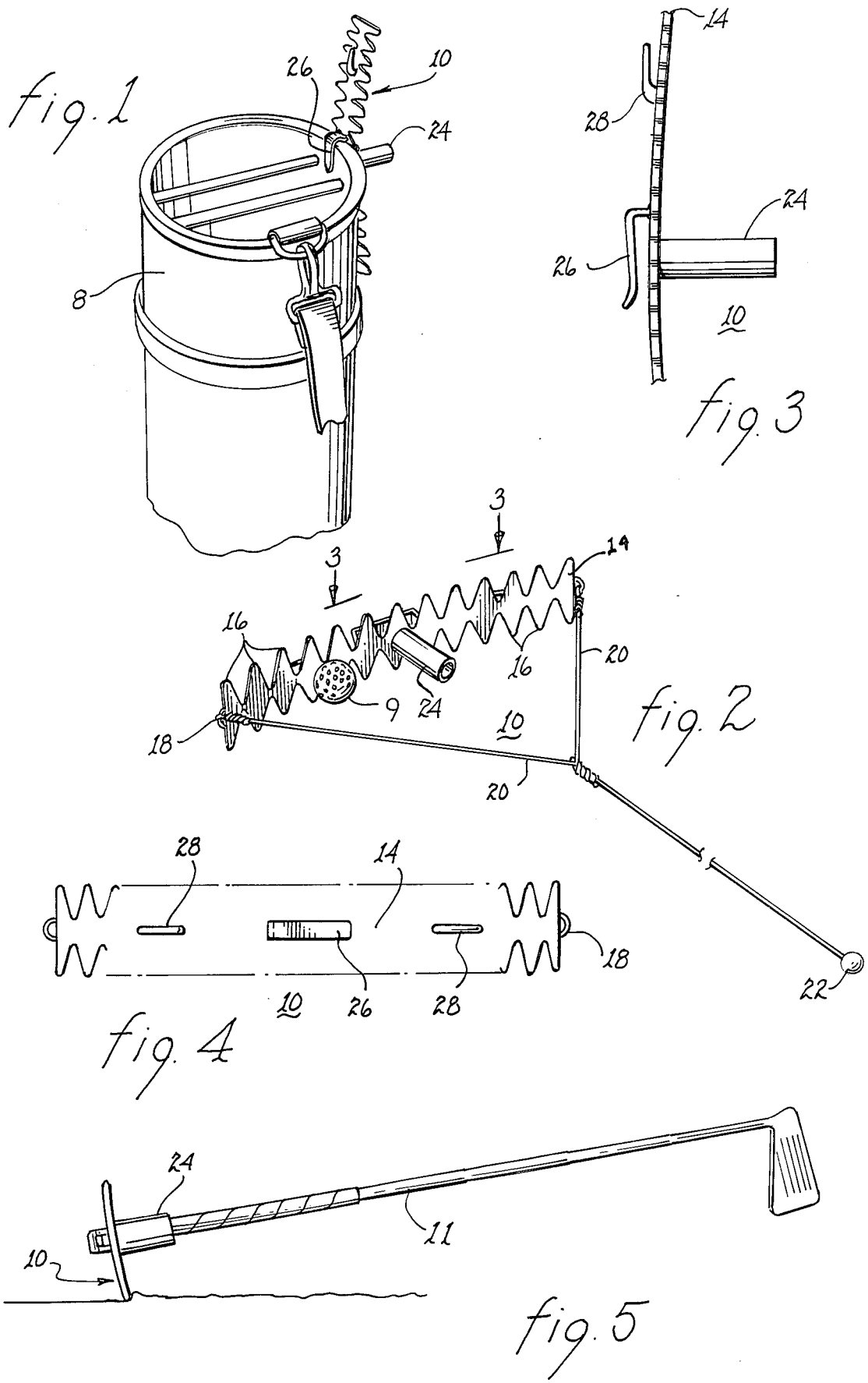

SAND TRAP RAKE AND GOLF BALL RETRIEVER AND METHOD

BACKGROUND OF THE INVENTION

1. Field of the Invention

This invention generally relates to devices used while playing golf, and more particularly, to a single device which performs the dual function of raking sand in a sand trap and retrieving golf balls from ponds.

Golfers frequently find that their golf balls land in the various hazards designed as part of the golf course such as sand traps and water hazards. When the ball lands in a sand trap, the rules dictate that the golfer rake the sand where the ball landed, the swing occurred, and where the golfer walked, in order to avoid creating additional hazards to subsequent golfers. Although the golf course operators usually supply a rake at each sand trap, often the rake is either lost or opposite the ball on a particularly long trap. The hike around the trap slows the game and can fatigue the player and affect the golfer's swing. This is particularly a problem with elderly and retired golfers, many of whom find it difficult to move about. Since the retired and elderly constitute a large percentage of the frequent golfers, the inconvenient rake problem can become a major consideration. Golfers need a device which is light weight and easily carried into the sand trap when they go to hit the ball. Golfers with mobility problems, as well as those tired of "hunting for the rake", would welcome such a device.

2. Description of the Prior Art

Another problem encountered by all golfers is that a water hazard is frequently located near the greens. When a ball is hit into the water, unless it is extremely close to shore, it can not be retrieved without the golfer getting wet. Although certain devices have been designed to retrieve golf balls after they are hit into a pond, these are limited to the reach of the golfer when using an extended pole. If the ball is out of reach of the pole, the ball is lost. Such devices are also difficult for golfers with limited mobility to use. In addition, the devices are normally bulky and difficult for golfers with mobility problems to carry around.

A need therefore exists for a compact, light weight device which performs the dual function of a sand trap rake and a golf ball retriever, and which can be easily carried about and used by those golfers with limited mobility. The apparatus would also be convenient for golfers without mobility problems, but interested in conserving energy.

SUMMARY OF THE INVENTION

It is an object of this invention to provide an improved apparatus and method which combines, in a single small and compact unit, a sand trap rake and golf ball retriever for raking sand traps and retrieving golf balls from water hazards.

It is also an object of the present invention to provide an improved apparatus and method which inexpensively combines a trap rake and a ball retriever into a unit which is small, light weight, easily attached to the side of a golf bag, and easily carried and used by golfers with limited mobility.

It is another object of the present invention to provide an improved apparatus and method which combines a rake and a ball retriever into a single unit of which the grip portion of a conventional golf club can be used as a handle for the rake when raking the sand trap.

It is a further object of the present invention to provide an improved apparatus and method of combining a rake and a ball retriever which allows the ball retriever to be cast a substantial distance into a pond and be retrieved by means of a retrieving line.

The foregoing and other, objects, features, and advantages, of the present invention, hereinafter disclosed, will become more apparent from the following, more detailed, description of the present invention with reference to the accompanying drawings.

BRIEF DESCRIPTION OF THE DRAWINGS

FIG. 1 is a front elevational view of the rake/ball retriever attached to a golf bag.

FIG. 2 is a top elevational view of the rake/ball retriever when used as a ball retriever showing the pull cord in operational mode.

FIG. 3 is a top fragmentary view of the central portion of the rake/ball retriever.

FIG. 4 is a front lateral view of the rake/ball retriever.

FIG. 5 is a side elevational view of the rake/ball retriever attached to the end of a golf club in operation as a sand trap rake.

DESCRIPTION OF THE PREFERRED EMBODIMENT

Referring now to FIG. 1 of the accompanying drawings which set forth the present invention in greater detail and in which like numerals designate like elements, there is shown a trap rake/ball retriever 10 coupled side of a golf bag 8.

As best shown in FIG. 2, the retriever 10 consists essentially of a flat plate 14, preferably construed of metal, having a plurality of retrieving teeth 16, positioned on both upper and lower longitudinal surfaces for use as a sand rake or for retrieving lost golf balls from ponds. There are also eyelets 18 on either end of the plate 14, for use as attaching means for a retrieval line 20, used to pull in a ball lost in a pond. At the end of the retrieval line 20, is a spherical-shaped member 22, for facilitating use of the retriever 10. Also depicted in FIG. 2, is a receiving apparatus 24, coupled perpendicularly to the plate 14, and appropriate for receiving the handle of a golf club when the retriever 10, is being used as a rake.

As best shown in FIG. 3, attached to the plate 14, is a clip member 26 for use in attaching the rake/ball retriever 10, to the side of a golf bag, when not in use.

As best shown in FIG. 4, the rake/ball retriever 10 has two opposing hook means 28, for winding the retrieval line 20 around, when the retriever 10 is not being used to retrieve golf balls.

Referring now to FIG. 5, the rake/ball retriever 10 is coupled to the grip portion of a golf club 11 when being used as a sand rake.

While the invention has been particularly shown and described in reference to the preferred embodiment thereof, it will be understood by those skilled in the art that changes in form and details may be made without departing from the spirit and scope of the invention.

I claim:

1. An improved sand trap rake and golf ball retriever comprising:

plate member means having a plurality of teeth positioned on an upper longitudinal surface and a lower longitudinal surface thereof;

flexible retrieval means coupled to said plate member means for retrieving said retriever;

receiving means coupled to said plate member means for engaging a golf club; and said flexible retrieval means comprises a cord-like system.

2. An improved sand trap rake and golf ball retriever comprising:

plate member means having a plurality of teeth positioned on an upper longitudinal surface and a lower longitudinal surface thereof;

flexible retrieval means coupled to said plate member means for retrieving said retriever;

receiving means coupled to said plate member means for engaging a golf club; and hook means for winding said flexible retrieval means around when not in use.

3. An improved method of retrieving a golf ball comprising the steps of:

providing plate member means having a plurality of teeth positioned on an upper longitudinal surface and a lower longitudinal surface thereof;

providing flexible retrieval means coupled to said plate member means for retrieving a golf ball;

propelling said plate member means beyond said golf ball; and thereafter drawing said plate member means by pulling on said flexible retrieval means; and said flexible retrieval means comprises a cord-like system.

4. An improved method of retrieving a golf ball comprising the steps of:

providing plate member means having a plurality of teeth positioned on an upper longitudinal surface and a lower longitudinal surface thereof;

providing flexible retrieval means coupled to said plate member means for retrieving a golf ball;

propelling said plate member means beyond said golf ball; and thereafter drawing said plate member means by pulling on said flexible retrieval means; and providing hook means for winding said flexible retrieval means around when not in use.

* * * * *